United States Patent
Kazem (10) Patent No.: US 7,771,582 B2
(45) Date of Patent: Aug. 10, 2010

(54) METHOD AND APPARATUS FOR CONDUCTING A CHEMICAL REACTION IN THE PRESENCE OF CAVITATION AND AN ELECTRICAL CURRENT

(75) Inventor: Bijan Kazem, Woodstock, GA (US)

(73) Assignee: Hydro Dnamics, Inc., Rome, GA (US)

( * ) Notice: Subject to any disclaimer, the term of this patent is extended or adjusted under 35 U.S.C. 154(b) by 1130 days.

(21) Appl. No.: 10/843,104

(22) Filed: May 11, 2004

(65) Prior Publication Data
US 2004/0232006 A1 Nov. 25, 2004

Related U.S. Application Data

(60) Provisional application No. 60/471,537, filed on May 19, 2003.

(51) Int. Cl.
*B01F 7/02* (2006.01)
(52) U.S. Cl. ..................... 205/687; 204/450
(58) Field of Classification Search ............... 204/450; 366/279, 305; 208/133; 162/30.11; 385/133
See application file for complete search history.

(56) References Cited

U.S. PATENT DOCUMENTS

| | | |
|---|---|---|
| 2,907,455 A | 10/1959 | Sasaki |
| 3,198,191 A | 8/1965 | Wyszomirski |
| 3,834,982 A | 9/1974 | Alexandrovich et al. |
| 3,873,414 A | 3/1975 | Rocher et al. |
| 3,920,534 A * | 11/1975 | Jensen et al. ............ 204/282 |
| 3,948,489 A | 4/1976 | Sawyer |
| 3,954,589 A * | 5/1976 | Aber et al. ............... 204/450 |
| 4,075,248 A | 2/1978 | Marshall et al. |
| 4,137,159 A | 1/1979 | Sawyer |
| 4,168,295 A | 9/1979 | Sawyer |
| 4,273,075 A | 6/1981 | Freihage |
| 4,357,931 A | 11/1982 | Wolpert et al. |
| 4,369,100 A | 1/1983 | Sawyer |
| 4,619,733 A | 10/1986 | Kooi |
| 4,687,549 A | 8/1987 | Kallmes |
| 4,781,151 A | 11/1988 | Wolpert et al. |
| 4,906,387 A | 3/1990 | Pisani |
| 4,978,426 A | 12/1990 | Lowry |
| 4,990,260 A | 2/1991 | Pisani |
| 4,993,947 A | 2/1991 | Grosrey |

(Continued)

FOREIGN PATENT DOCUMENTS

CA 2115383 8/1994

(Continued)

OTHER PUBLICATIONS

English Translation of DE 10015144 Oct. 4, 2001.*

(Continued)

*Primary Examiner*—Mark F Huff
*Assistant Examiner*—Rashid Alam
(74) *Attorney, Agent, or Firm*—Womble Carlyle Sandridge & Rice, PLLC (57) ABSTRACT

Disclosed is a method and apparatus for conducting a chemical reaction. The reaction is conducted in a reaction vessel or mixing occurring in at least a partial liquid environment in which reactants are disposed. The reaction is conducted in the presence of cavitation and an electrical current.

24 Claims, 7 Drawing Sheets

U.S. PATENT DOCUMENTS

| | | | |
|---|---|---|---|
| 5,082,526 A | 1/1992 | Dorris | |
| 5,085,734 A | 2/1992 | Griggs | |
| 5,116,227 A | 5/1992 | Levy | |
| 5,141,328 A | 8/1992 | Dilley | |
| 5,173,049 A | 12/1992 | Levy | |
| 5,173,153 A | 12/1992 | Terrett et al. | |
| 5,188,090 A | 2/1993 | Griggs | |
| 5,211,811 A | 5/1993 | Griggs et al. | |
| 5,217,574 A | 6/1993 | Griggs | |
| 5,218,984 A | 6/1993 | Allen | |
| 5,236,726 A | 8/1993 | Lancaster | |
| 5,296,099 A | 3/1994 | Griggs et al. | |
| 5,354,458 A * | 10/1994 | Wang et al. | 210/180 |
| 5,385,298 A * | 1/1995 | Griggs | 237/1 R |
| 5,490,727 A | 2/1996 | Poschl | |
| 5,494,748 A | 2/1996 | Spehner | |
| 5,519,670 A | 5/1996 | Walter | |
| 5,525,195 A | 6/1996 | Friend et al. | |
| 5,534,118 A | 7/1996 | McCutchen | |
| 5,538,594 A | 7/1996 | Hank et al. | |
| 5,552,133 A | 9/1996 | Lambert et al. | |
| 5,569,180 A | 10/1996 | Spears | |
| 5,605,567 A | 2/1997 | Lancaster | |
| 5,685,342 A | 11/1997 | Ekholm | |
| 5,735,934 A | 4/1998 | Spears | |
| 5,762,789 A * | 6/1998 | de los Reyes et al. | 210/321.75 |
| 5,782,556 A | 7/1998 | Chu | |
| 5,810,052 A | 9/1998 | Kozyuk | |
| 5,937,906 A | 8/1999 | Kozyuk | |
| 5,957,122 A | 9/1999 | Griggs | |
| 5,964,983 A | 10/1999 | Dinand et al. | |
| 6,030,221 A | 2/2000 | Jones et al. | |
| 6,074,527 A | 6/2000 | Hsu et al. | |
| 6,162,767 A | 12/2000 | Adam | |
| 6,365,555 B1 | 4/2002 | Moser et al. | |
| 6,386,751 B1 | 5/2002 | Wootan et al. | |
| 6,454,900 B2 | 9/2002 | Bokstrom et al. | |
| 6,540,922 B1 | 4/2003 | Cordemans et al. | |
| 6,627,784 B2 * | 9/2003 | Hudson et al. | 588/320 |
| 6,691,358 B1 | 2/2004 | Engstrom et al. | |
| 6,719,880 B2 | 4/2004 | Speaks et al. | |
| 2002/0077373 A1 | 6/2002 | Hudson et al. | |
| 2003/0042126 A1 | 3/2003 | Nguyen et al. | |
| 2003/0057163 A1 | 3/2003 | Wood | |

FOREIGN PATENT DOCUMENTS

| | | |
|---|---|---|
| DE | 2323751 A * | 11/1974 |
| DE | 2323751 A1 | 11/1974 |
| DE | 3327137 A1 | 2/1984 |
| DE | 10015144 | 10/2001 |
| DE | 10015144 A1 * | 10/2001 |
| EP | 0610914 A1 | 8/1994 |
| EP | 0680779 A1 | 11/1995 |
| GB | 2176535 | 12/1986 |
| JP | 48-61704 | 8/1973 |
| JP | 55139891 | 1/1980 |
| JP | 55102491 A | 8/1980 |
| JP | 56045791 | 4/1981 |
| JP | 56152789 | 11/1981 |
| JP | 57111388 | 7/1982 |
| JP | 60008391 A2 | 1/1985 |
| JP | 60226594 A | 11/1985 |
| JP | 62-213895 A * | 9/1987 |
| JP | 62213895 * | 9/1987 |
| JP | 62213895 A | 9/1987 |
| JP | 6039262 | 2/1994 |
| JP | 08218291 A | 8/1996 |
| SU | 1694196 | 11/1991 |
| WO | WO 94/11096 A1 | 5/1994 |
| WO | WO 00/04932 | 2/2000 |
| WO | WO 00/64818 | 11/2000 |
| WO | WO 01/87471 | 11/2001 |
| WO | WO 2004/022838 | 3/2004 |
| WO | WO 2004/103911 | 12/2004 |

OTHER PUBLICATIONS

English Translation of DE 2323751 Nov. 1974.*

Hawley's Condensed Chemical Dictionary, edited by Sax and Lewis, Sr., Oct. 1989, p. 233, Eleventh Edition, Van Nostrand Reinhold Company, New York, NY.

Military Support Transp. Acad, "General Purpose Decontaiminator of Liq.—Consists of Electrode Chamber with Pulsed Current Generating Extremely High Pressure, and Cavitation", XP002298878, Derwent Publications Ltd., London, GB, Section Ch, Week 199523 (Abstract).

"Einsatz von Ultraschall zum Schadstoffabbau in Wasser: Aquasonolyse—Eine Ubersicht", Lifka J. et al., XP002298730, Chemie Ingenieur Technik, vol. 74, No. 4, pp. 403-413, Weinheim, DE.

* cited by examiner

METHOD AND APPARATUS FOR CONDUCTING A CHEMICAL REACTION IN THE PRESENCE OF CAVITATION AND AN ELECTRICAL CURRENT

CROSS-REFERENCE TO RELATED APPLICATION

The present application claims benefit of U.S. Provisional Patent Application Ser. No. 60/471,537 filed May 19, 2003, which is incorporated herein in its entirety by reference.

TECHNICAL FIELD

The present invention relates generally to the field of chemical reactions. More specifically, the present invention relates to methods and devices for improving the efficiency of chemical reactions.

BACKGROUND

In the processing of certain chemical compounds and in the treatment of certain wastewaters, it desirable to initiate various chemical reactions. Such chemical reactions are further aided by the introduction of a catalyst to accelerate the pace of the reaction and to aid in initiating the reaction. Additionally, heat can be added to speed up the reaction. Examples of desirable chemical reactions include inorganic electro-synthesis, organic electro-synthesis, electro-remediation, electro-decolorization, electro-bleaching, generation of hydrogen peroxide and ethylene glycol, and synthesis of L-Cysteine and sodium hydrosulfite.

In the example of wastewater treatment, it is desirable to oxidize cyanide to cyanate. Simple cyanides as well as complex cyanide compounds are present in wastewater effluents from chemical operations such as metal plateing and mining operations. Cyanide effluents cannot be discharged without treatment due to the toxic nature of the chemical compound. One form of treatment includes the oxidation of cyanide to cyanate which is less toxic and can be further processed to carbon dioxide and nitrogen. Current methods of oxidizing cyanide includes the introduction of peroxides, ozone containing gases and U.V. light treatment and the introduction of heat. Unfortunately, each of the described methods requires either the addition of a chemical accelerant or catalyst and/or the introduction of heat. Each of these methods is done at a considerable expense.

What is needed is a method and apparatus for improving the efficiency of chemical reactions which is independent of chemical catalysts or the introduction of heat.

SUMMARY

Briefly described, the present invention comprises both a method and apparatus for conducting one or more chemical reactions in the presence of cavitation and an electrical current or potential. Typically, the reaction is conducted in a reaction vessel or mixing occurring in at least a partial liquid environment. The reaction is promulgated by the introduction of an electrical current through the liquid containing reactants in the presence of cavitation. Cavitation includes the sudden formation and collapse of low pressure bubbles in a liquid medium by means of mechanical force. Additionally, the cavitation may be hydrodynamic in that there is a formation and collapse of implosive vapor bubbles in a liquid created by fluctuations in the fluid pressure.

In another aspect of the present invention, an apparatus for conducting a chemical reaction is described. The apparatus comprises a housing, a rotatable disc disposed within the housing and having at least one irregularity for producing cavitation in a liquid environment, and an anode and cathode for creating an electrical current across the liquid in the presence of the cavitation. The rotor has a periphery, and the bores are formed in the periphery. When the housing and the disc are formed of an electrically-conductive material, the housing and the disc may comprise the anode and the cathode or vice versa.

DETAILED DESCRIPTION

The present invention comprises both a method and apparatus for improving the efficiency of a chemical reaction. In accordance with the present invention, the reaction is conducted in a reaction zone that is disposed between a positively charge electrode and a negatively charged electrode in the presence of cavitation and an electrical current induced between the electrodes.

In greater detail, chemical reactions generally take place when electrons move from one molecule to another. Under certain conditions, an electrical current can provide energized electrons to ionize reactants for chemical reactions to occur without adding heat or employing a catalyst. Upon the introduction of an electrical current into a reaction zone conducted in the presence of a liquid, the electrons generate ions and radicals in the liquid. The electric fields created around the electrodes supply an electrical potential area where the reactants may be ionized. Furthermore, in combination with cavitation agitation, the reactants are mixed, which provides refreshment of reactants at the electrodes. In accordance with the present invention, the housing and the rotor respectively comprise the electrodes. Further, the mixer comprises the housing and the rotor, and the reactor comprises the mixer.

A reaction zone is defined as the volume created between the internal surface of the housing and the surface of the rotor, including the volume of the cavities extending into the rotor from the surface thereof. An electrical current is sent through the reaction zone to provide excited electrons. As the rotor is rotated at a sufficient speed, cavitation occurs within the cavities and produces strong shockwaves and agitation. Although not wanting to be bound by theory, it is believed that the energy of cavitation at the collapse of the cavitation bubble provides bond breaking energy which aids in further ion generation. As a result, it is easier for an excited electron to move from one reactant to another reactant, thereby increasing the reaction efficiency and/or yields.

In electrochemical treatment reactants which are treated on the surface of electrodes need to be removed therefrom as quickly as possible for other reactants to come into contact with the electrode surface. Since this movement is very low under conventional conditions, sufficient surface area is required to reach the desired final results. By employing a Shockwave Power Generator (SPG), electrode surface refreshing is enhanced.

SPG and Surface Refreshing

Cavitation is sudden formation, growth and collapse of a low pressure bubble in a liquid environment. This action causes a violent mixing action in the liquid. Plus, the collapse of cavitation bubbles suddenly changes the liquid volume in the respective rotor cavity by pushing the liquid outside of the cavity. This action fluctuates the liquid pressure on the housing surface opposite the rotor cavity. Such fluctuation causes a sudden movement of liquid on the housing surface. These fluctuations on the respective electrode surfaces also cause high and low speed liquid currents for brief moments, thereby resulting in additional mixing of the reactants. This can be viewed as refreshing the reactants disposed within the liquid. As a result of cavitation, the respective cavity is not full of liquid due to the collapse of the cavitation bubble and has low pressure, the higher pressure liquid outside the rotor cavity moves to fill the cavity. Such action results in a decrease of pressure on the housing surface across from the respective cavity for a short time. The movement of liquid to fill the cavity causes additional mixing in the liquid. As cavitation occurs more in the cavity, the surfaces are refreshed more rapidly, resulting in even further mixing of the liquid. The effect of these mixing actions increases the refreshing of the housing surface and results in a more efficient exposure of the reactants to the respective electrode surfaces, less reactor surface area, higher selectivity of the reactants, less energy consumption due to smaller mixing motors and reduced current as compared to convention electrochemical processes, and a smaller footprint due to reduced reactor surface area requirements.

Figure 1:
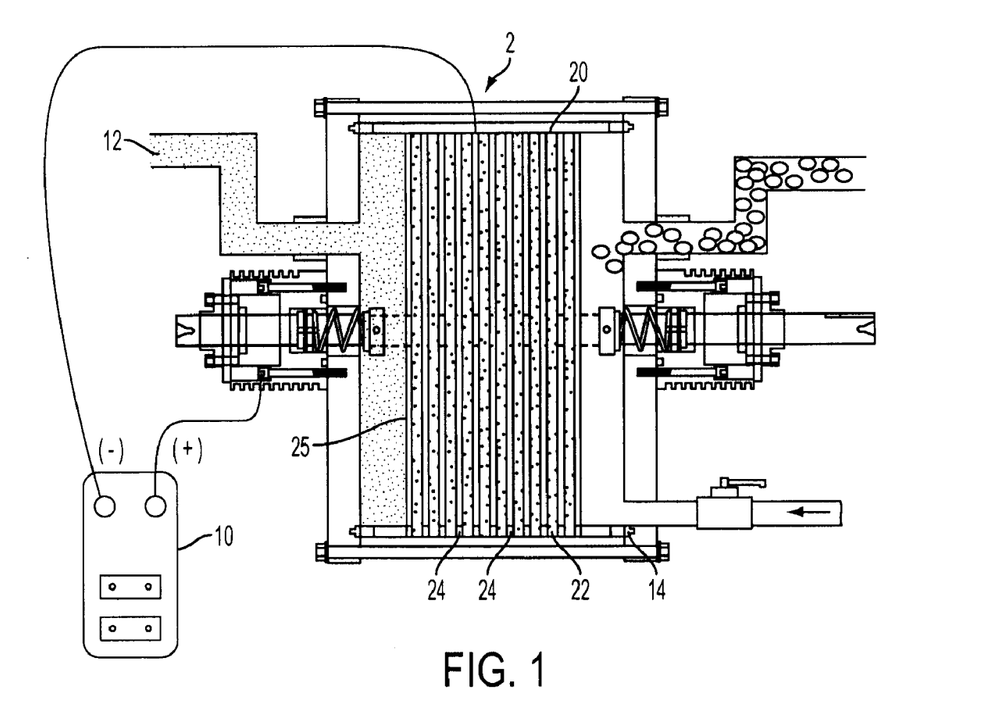
FIG. 1 is a cut away illustration of the apparatus utilizing a mixing device and the application of an electric current.

FIG. 1 illustrates one aspect of the apparatus made in accordance with the present invention. An inlet feed 4 is operatively connected to a mixing device 2 via a conduit or pipe for delivering a waste stream or chemical premix. The mixing device 2 can be a ShockWave Power Generator (SPG) as described in detail in U.S. Pat. No. 5,188,090, the disclosure of which is hereby incorporated by reference. Briefly described, the mixing device 2 comprises a housing 20 and a rotatable disc or rotor 22 disposed within the housing 20. The rotor 22 has a plurality of irregularities 24 disposed on the periphery 25 of the rotor 22 for producing cavitation in the liquid. As illustrated, the irregularities are bores. Alternatively, the irregularities can be protrusions, detents, blades or any surface modification capable of causing cavitation. The housing 20 and the rotor 22 may be formed from electrically-conductive materials and thereby act as either an anode or cathode, depending upon which electrical pole the housing 20 and rotor 22 are respectively connected, for creating an electrical current across the liquid in the presence of the cavitation. Of course, any mixing device may be used which is capable of mixing and creating cavitation. A power supply 10 is operatively connected to the housing 20 and the rotor 22 of the mixing device 2 to provide an electrical current. Additionally, an electric insulator 14 may be added to the mixing device 2. The reaction substantially takes place within mixing device 2. The reacted product may exit the mixing device 2 through the exit conduit 12.

Figure 2:
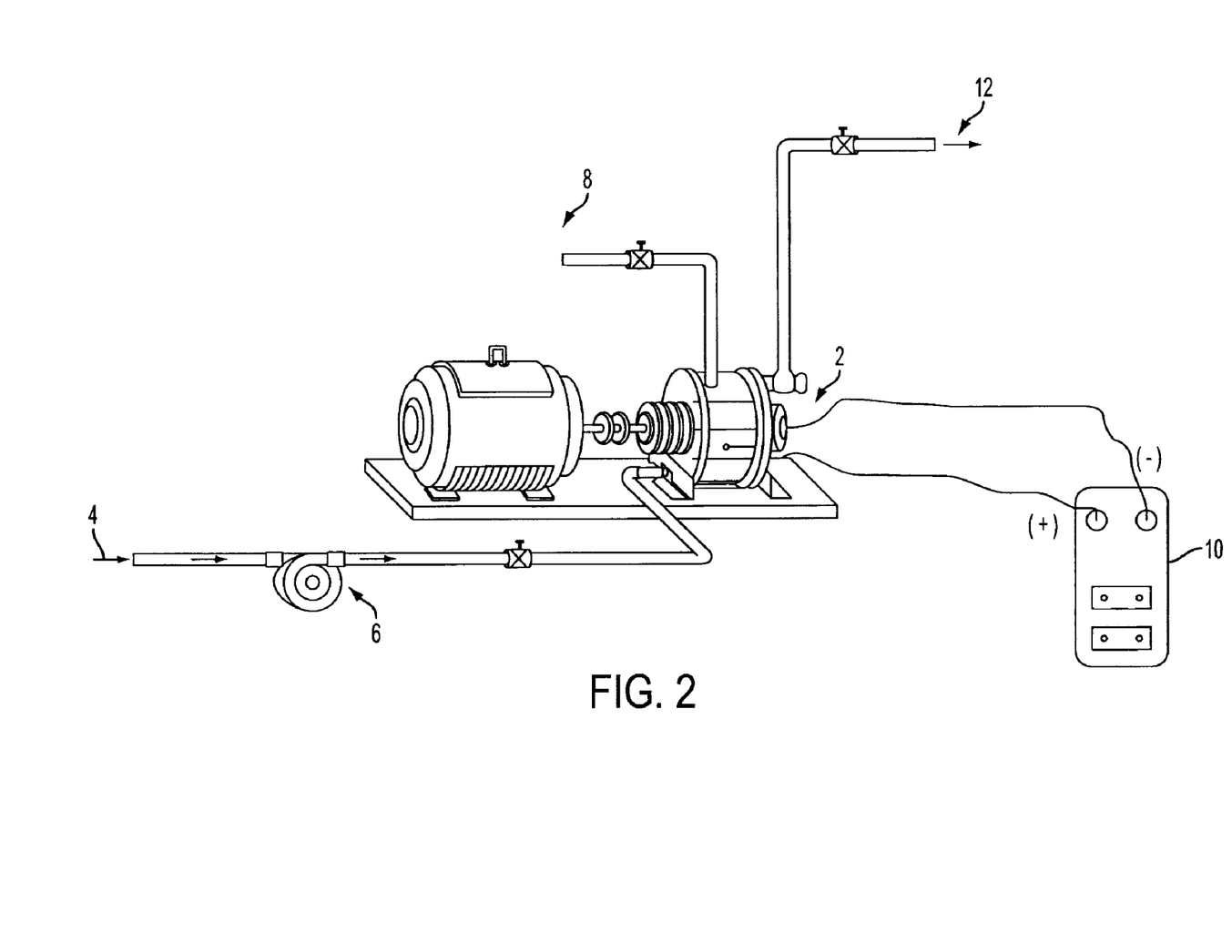
FIG. 2 is a further illustration of utilizing a mixing device and the application of an electric current and, in an embodiment, chemical additives.

FIG. 2 illustrates another aspect of an apparatus in accordance with the present invention which also employs an electric current. In this aspect of the present invention, one or more chemical additives, including an oxidizing agent, may be introduced into the reaction zone to further aid the reaction. The apparatus includes a feed pump 6 operatively connected to a mixing device or mixer 2 via a conduit or pipe for delivering a waste stream such as black liquor. Typically, the conduits which are connected to the mixing device 2 are non-metal, substantially non-electrically conductive, electrically insulated or any combination thereof. The mixing device 2 can be the SPG of FIG. 1. A power supply 10 is operatively connected to the mixing device 2 to provide an electrical current. The amount of electric current depends on the concentration of the liquor. Radicals are formed on the surface of the electrodes and may be employed to enhance the chemical reaction(s) being conducted. As discussed above, mixing allows for refreshing of the reactants at the electrodes for increased efficiency. Since the reaction process is rapid, there is no theoretical need for reactant retention time. As a result of the method of the present invention, the exposure of reactants to the electrodes is enhanced. Based on the surface area and the concentration of the liquor, the electric consumption can be approximately calculated.

Figure 3:
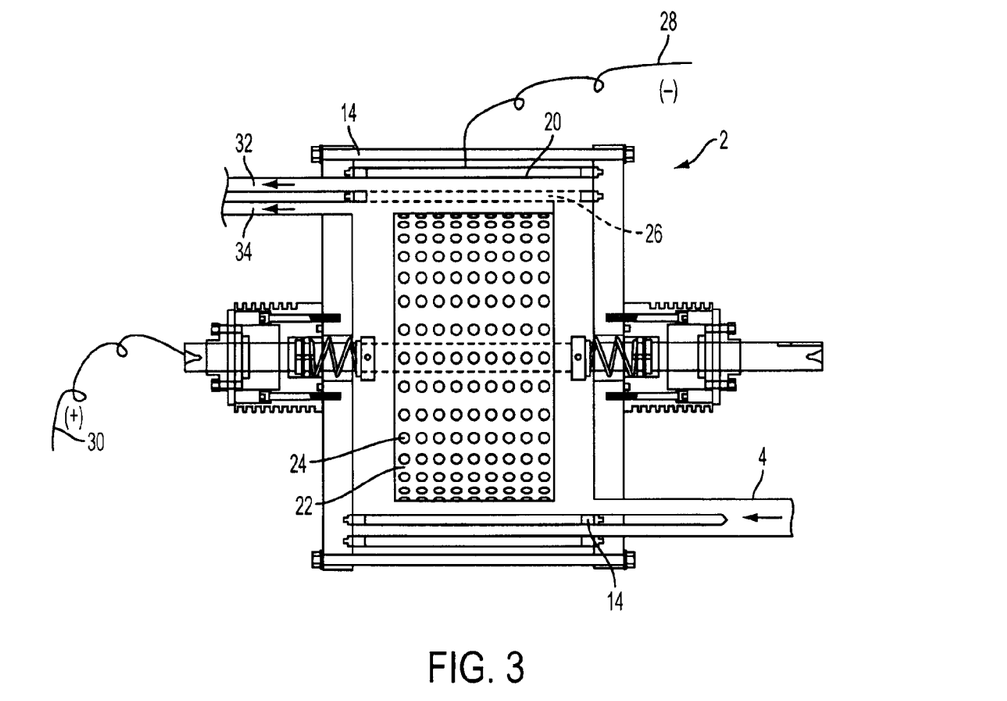
FIG. 3 is a cut away view of the mixing device and the application of the electric current.

FIG. 3 illustrates yet another aspect of an apparatus in accordance with the present invention. In addition to the features of the SPG described above, the SPG illustrated in FIG. 3 additionally includes an ion exchange membrane 26 disposed between the housing 20 and the rotor 22. The ion exchange membrane 26 provides for separation of different products produced in at least two reactions occurring within the mixing device 2. This may occur by separating the reactants with the ion exchange membrane prior to the respective products being formed. An inlet feed 4 is operatively connected to a mixing device 2 via a conduit or pipe for delivering a waste stream or chemical premix. Similarly as described above, an electrical current is provided through electrical leads 28 and 30 which are respectively and operatively connected to the housing 20 and the rotor 22. Leads 28 and 30 are operably connected to a power supply (not shown). The reaction substantially takes place within the mixing device 2, and the separated products exit the mixing device 2 from product conduits 32 and 34.

Referring again to FIG. 2, in an another aspect of the present invention, a chemical additive, such as sodium hydroxide, hydrogen peroxide and oxygen may be introduced to the mixing device 6 via a chemical conduit inlet 8. The addition of such additives can add further ions to the mix. For example, oxygen in the presence of the electrical current and the cavitation forms ozone and oxygen radicals. These radicals act to assist in improving the efficiency of the chemical reaction(s) occurring in the reaction zone.

Additionally the cyanide anion ($CN^-$) may be removed by the electrochemical conversion of the cyanide anion to the cyanate anion ($OCN^-$). The cyanate anion is less toxic than the cyanide anion. The electrochemical half-reaction of this conversion is shown below.

$$CN^- + 2OH^- \rightarrow OCN^- + H_2O + 2e^-$$

For very low concentrations of cyanide, this electrochemical reaction can become mass transport limited as the driving force for cyanide diffusion towards the electrode will be very small. This electrochemical reaction accelerated in the present invention using vigorous mixing, such as by the SPG device which provides the vigorous mixing necessary to allow the reaction to proceed at a significant rate.

In another aspect, the spent pulping liquor from the pulping operation, known as black liquor, may be treated in accordance with the present invention. Black liquor is a mix of organic wood derivatives and alkaline pulping chemicals. Usually, black liquor is concentrated and then is combusted in a recovery boiler to burn off its carbon content. The concentrated black liquor is heated with steam to lower its viscosity and processed in evaporators and concentrators before it reaches a recovery boiler where it is burned for its heat value and recovery of inorganic chemicals. The residual mass, known as smelt, then is further processed to form white liquor for recycle to the digestion step.

Black liquor typically comprises NaOH, water, organic materials, inorganic materials, $Na_2S$ and additional components. Commonly, these chemicals are stable in the form that which they are present in the black liquor. The introduction of an electrical current provides a way to excite some of the electrons to produce radicals for chain cleavage to reduce black liquor viscosity. In an aspect of the present invention, black liquor may be treated in the presence of caviation and an electrical current to reduce the viscosity. Additionally, the treatment may be conducted in the presence of ozone and/or oxygen to generate radicals to assist in reducing black liquor viscosity Ozone is an example of an oxidizer suitable for use in the present method and apparatus. Ozone is a very strong oxidizer which is not selective and is capable of attacking most any chemical bond. In adding ozone to the black liquor, which contains organic compounds, the viscosity of the black liquor can be reduced by breaking the long chain organic molecules into shorter chains. The addition of ozone is also advantageous in that the chemical does not remain in the liquor as either a liquid or gas, thus it does not have an detrimental residual effect. Additionally, since black liquor is only about 50% solids, there is little chance of fire in the use ozone in combination with black liquor viscosity reduction. The amount of ozone to black liquor is calculated base on the number of molecules in the long chain. Not illustrated, an ozone generator may be used to produce oxidizing agent. This process does not require retention time.

Experimental Examples

Procedure

The equipment employed in this example was a shockwave power generator (SPG) with stainless steel rotor and housing with variable speed drive, circulating pump, flow meter, air-cooled heat exchanger, and supply tanks. Forty liters of test solution were prepared in one of the supply tanks by adding approximately 6.6 N potassium hydroxide and crystalline potassium cyanide. For single pass experiments, the solution was pumped through the SPG and the heat exchanger and returned to the empty tank. For recirculating experiments, the solution was pumped through the SPG and the heat exchanger and returned to the full supply tank. The heat exchanger in the recirculating experiments was employed to maintain the solution at room temperature (about 75° F.) during the experiment.

For electrochemical experiments, the system was operated in constant current mode using a programmable power supply. The potentials of the anode and cathode were monitored using a desktop multi-meter and measured versus a standard calomel electrode inserted into the end plate of the SPG. Cyanide determination was performed using an ion selective electrode. The ion selective electrode was calibrated daily using known standards. The voltage response of the ion-selective electrode was measured versus a standard calomel electrode using a bench-top multi-meter.

Typically, the standard aqueous potassium hydroxide/potassium cyanide solution was prepared in one of the supply tanks. This solution was pumped through the SPO in a single-pass or recirculating fashion. For each experiment a substantially constant current ranging from 0 to about 10 amps was passed through the SPG while the test solution was pumped through the SPG. Also for each trial, the SPO was operated at a constant speed ranging from 0 to about 3600 RPM. Periodically throughout the trial the voltage of the anode and cathode versus the reference electrode was measured and recorded. The cyanide concentration in the test solution was measured periodically using the ion selective electrode by taking a sample from the outlet stream.

Insulation between the housing and the endplates was achieved with a sheet of neoprene/SBR rubber sheeting. This material formed both a gasket and an insulating layer. Additionally, the inside face of each endplate was coated with Viton. This material was observed to release from the surface of the endplates at higher rotational speeds and flow with the test solution.

Results

Electrochemical Conductivity

Figure 4:
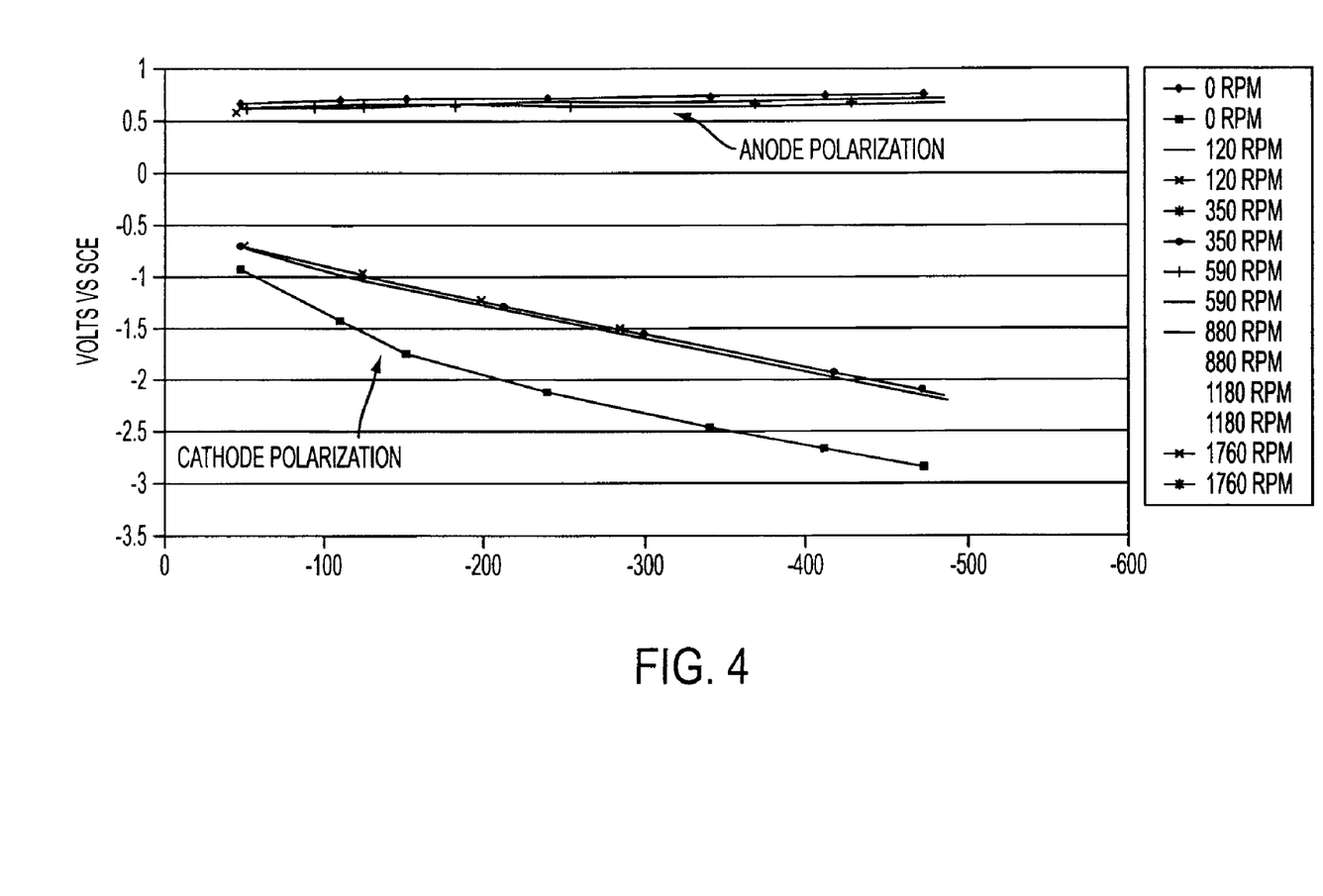
FIG. 4 is a chart illustrating the voltage-current behavior with varying rotational speeds with a dilute KOH solution.

The effect of SPG rotation on the electrochemical polarization within unit was examined. A dilute solution of potassium hydroxide (KOH) was pumped through the unit while passing an electrical current from the rotor (anode) to the housing (cathode). The rotor speed was varied from 0 to about 1762 RPM. A power supply was used in constant current mode to create the potential across the cell. For each trial, at a given current and rotational speed, the potential from anode to the reference electrode and the total potential of the cell was measured. Table 1. summarizes the parameters of the tests. The data is presented graphically in FIG. 4.

TABLE 1

Electrochemical Conductivity Test Parameters, the data show a pronounced change in the conductivity of the cell from 0 RPM to 120 RPM.

| | |
|---|---|
| Electrolyte Concentration | $4.6*10^{-4}$ M |
| Flow Rate | 1.0 GPM |
| Pressure within SPG | 16 psi |
| Inlet Temperature | ~21° C. |

Electrochemical Cyanide Destruction

Figure 5:
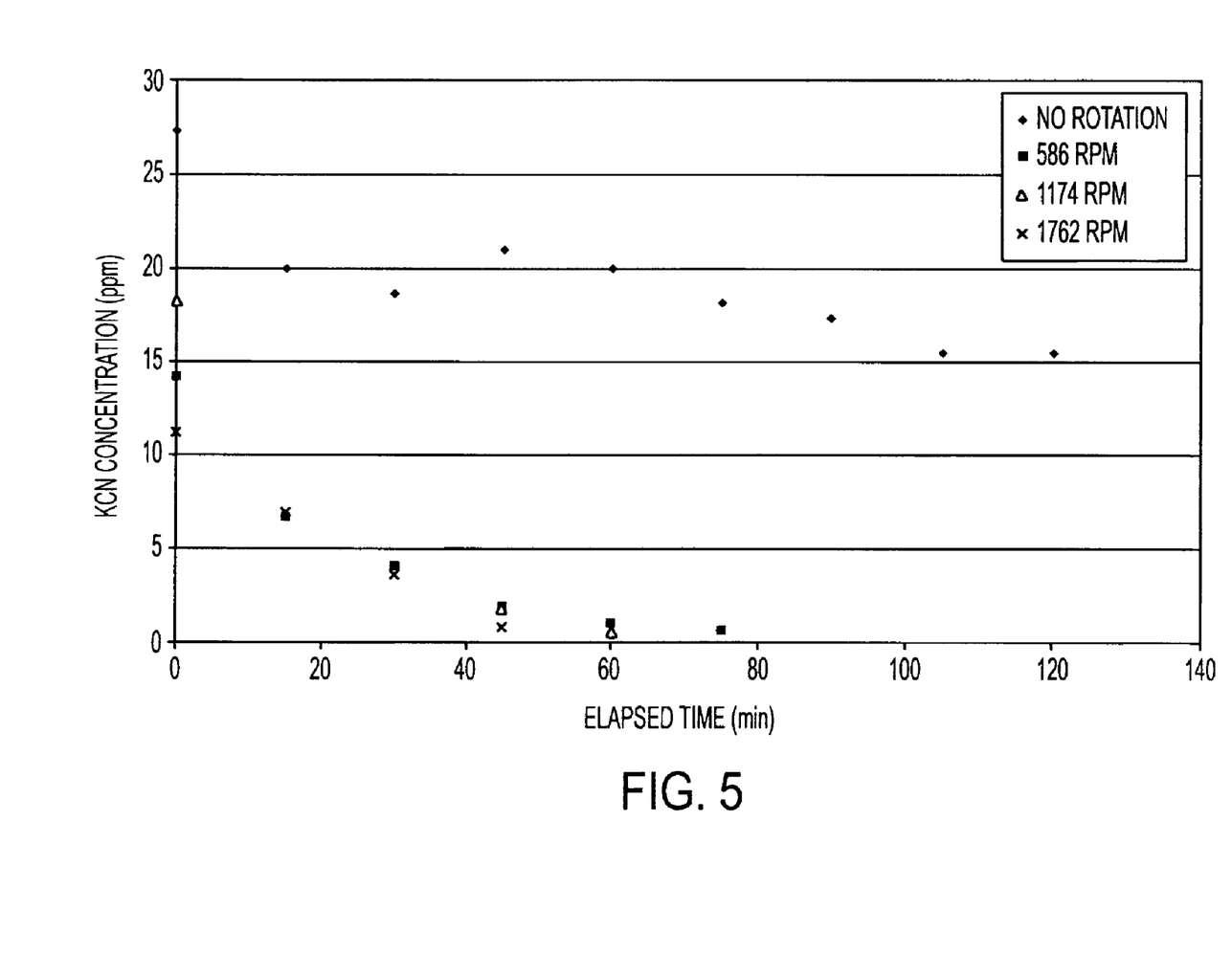
FIG. 5 is a further chart illustrating the electrochemical cyanide destruction at 5.0 amps and various rotational speeds.
Figure 6:
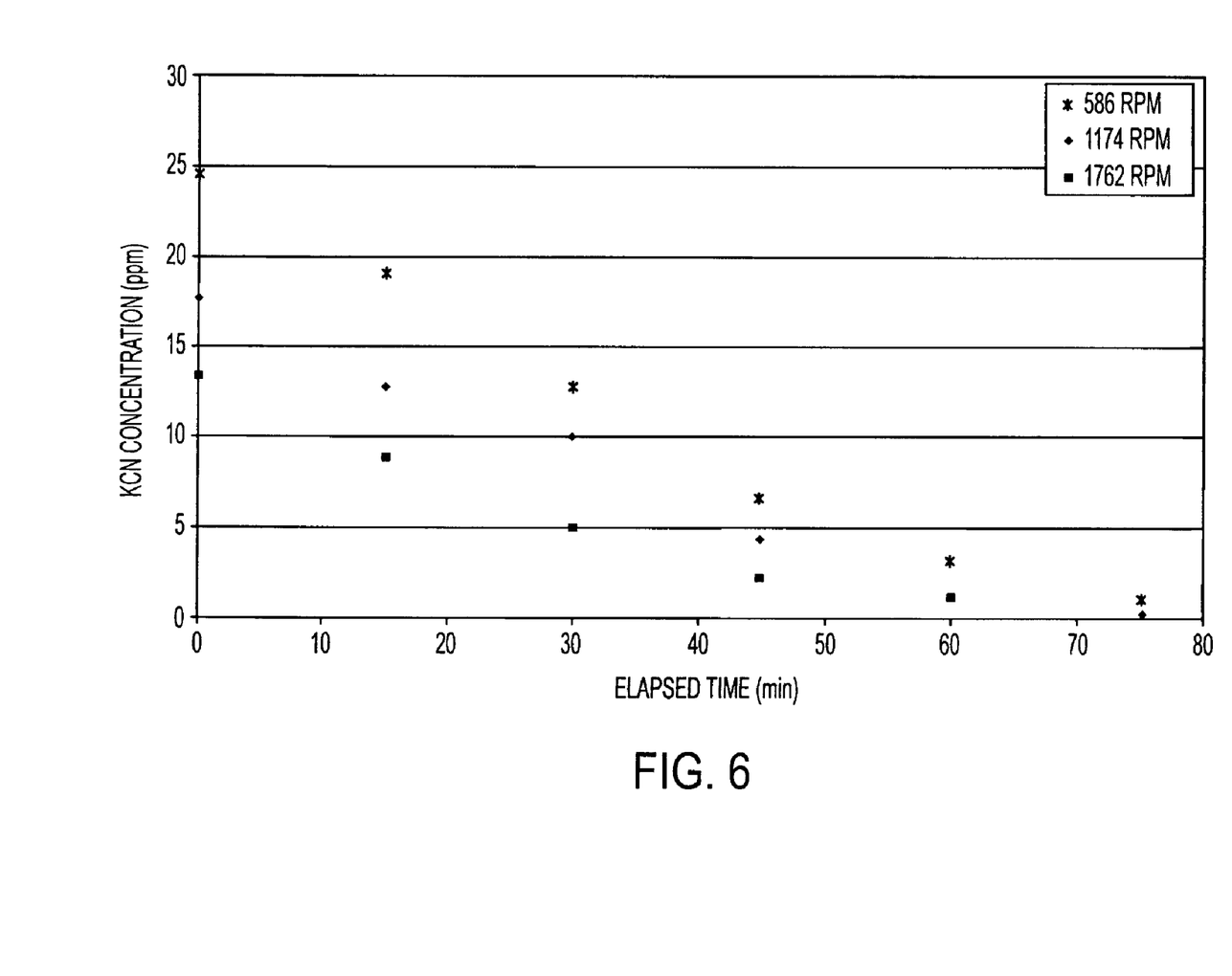
FIG. 6 is a graph showing the electrochemical cyanide destruction at 2.5 amps and various rational speeds.

Cyanide destruction was observed while running the system in full recycle mode at substantially constant current. In this configuration, solution is pumped from the supply tank into the SPG, passes through the SPG and heat exchanger and then returns to the supply tank. Under the proper conditions, the concentration of cyanide in the test solution will fall over time as it is electrochemically oxidized in the SPG. Data was collected over a range of rotational speeds and at different currents. The flow rata of test solution was maintained at about 1 gallon per minute (GPM) and the pressure in the SPG was about 15 PSI for all tests. The initial concentration of KCN did vary slightly from test to test remaining about 0.7 mg KCN/g of solution. Data collected at about 5.0 amps and various speeds is shown in FIG. 5. Data collected at about 2.5 amps is shown in FIG. 6.

The data clearly indicate a beneficial effect of the spinning rotor. The rate of reaction is significantly increased from no rotation to about 586 RPM, the lowest speed tested. These results are in agreement with the results from the conductivity experiments, that is a significant change from stationary rotor to rotating rotor.

Figure 7:
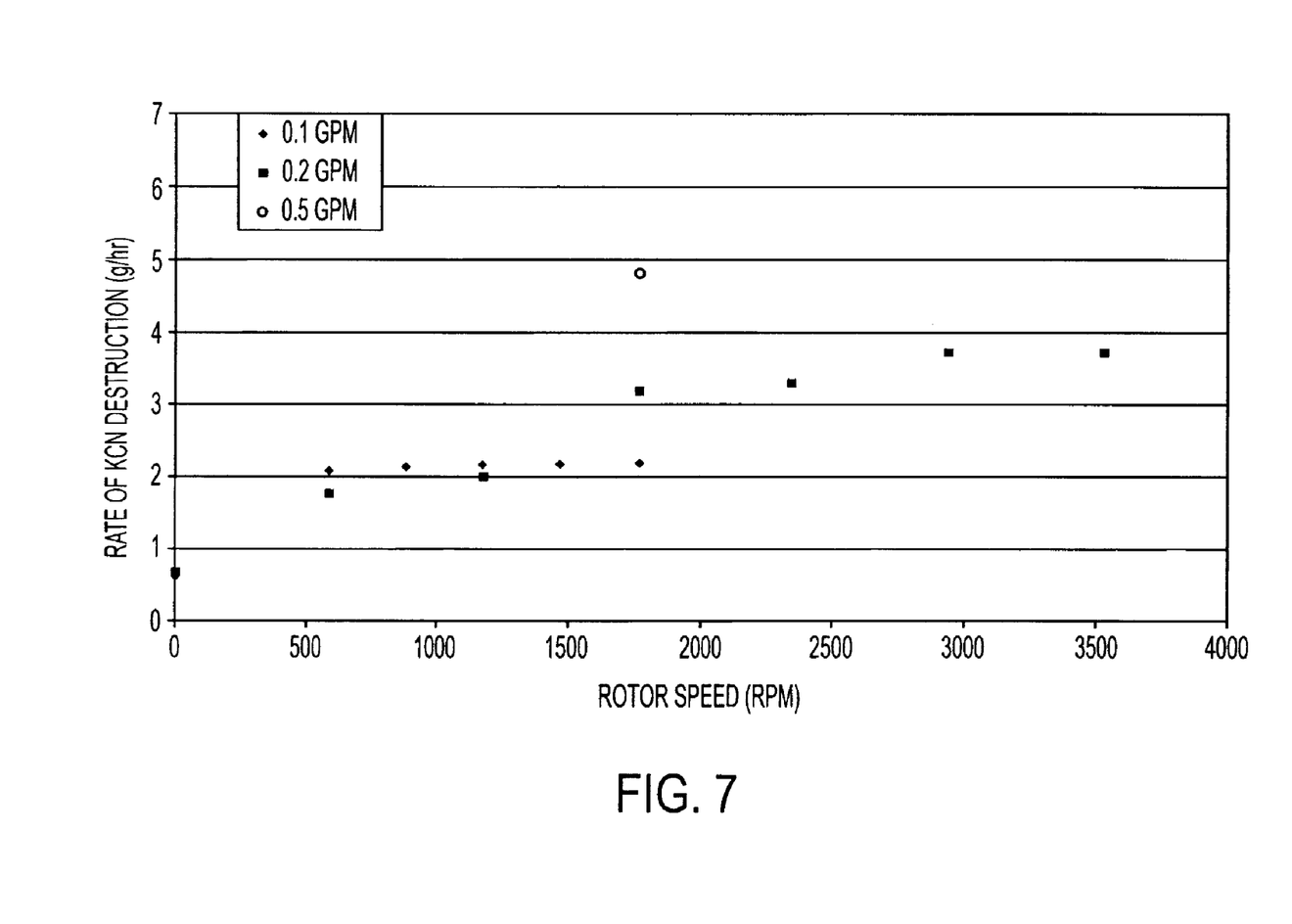
FIG. 7 is a chart showing the rate of cyanide destruction vs. the rotor speed at 2.5 Amps and various flow rates.

A further approach for cyanide remediation may operate with a single pass through the SPG electrochemical reactor. This approach was simulated using a lower flow rate of test solution and a similar current (about 2.5 Amps). The concentration of the test solution was measured at the beginning of the experiment and sample from the reactor effluent after a short time at the test conditions. For low flow rates (about 0.1-about 0.2 GPM) this time was about 10 minutes. For the higher flow rate (about 0.5 GPM) this time was about 5 minutes. From the measured flow rate and the inlet and outlet KCN concentrations, a KCN rate of destruction was calculated. This rate is shown versus rotor speed in FIG. 7. Once again the data shows that the spinning rotor leads to a higher rate of reaction than the stationary rotor. The highest rotor speeds have a higher rate of KCN consumption, but the heat generated by the SPG also leads to a much higher temperature within the device. At the highest speeds, the reaction temperature was as much as 40° F. higher than the stationary case. Higher reaction temperatures would probably lead to higher reaction rates as well.

Calculation shows that on any given point on the housing each cavity on the rotor running at about 3600 rpm comes back to the same point on the housing about 60 times per second and each time the minimum refreshing being one time, the surface on the housing was refreshed about 60 times by the same cavity. Each row has 30 cavities which results in about 1800 times refreshing of one point on the housing per second. Because the housing is an electrode, this means that electrode surfaces can be refreshed in a high rate utilizing this device.

What is claimed is:

1. An apparatus for conducting a chemical reaction comprising:
   a housing;
   a liquid disposed within the housing;
   a rotor disposed within the housing and having at least one irregularity for producing cavitation in the liquid upon rotation of the rotor, wherein
   the rotor and the housing are an anode and cathode, respectively, or the rotor and the housing are a cathode and an anode, respectively, the anode and the cathode being configured to create an electrical current across the liquid in the presence of the cavitation.

2. The apparatus of claim 1, wherein the irregularities are bores.

3. The apparatus of claim 2, wherein the rotor has a periphery, and the bores are formed in the periphery.

4. The apparatus of claim 1, further comprising an ion exchange membrane disposed between the housing and the rotor.

5. A method of conducting a chemical reaction comprising:
   introducing a fluid containing reactants into a chamber within a housing;
   rotating a rotor in the chamber to create cavitation in the fluid, wherein the rotor includes a plurality of irregularities that induce the cavitation; and
   establishing an electrical potential between the rotor and the housing in the presence of the cavitation in order to produce a product, wherein the rotor and the housing are an anode and a cathode, respectively, or wherein the rotor and the housing are a cathode and an anode, respectively.

6. The method of claim 5, further comprising refreshing a surface of at least one of the anode and cathode.

7. The method of claim 5, wherein the fluid comprises a cyanide anion.

8. The method of claim 7, further comprising oxidizing the cyanide anion to produce a cyanate anion.

9. The method of claim 5, further comprising conducting the chemical reaction in the presence of a gas, wherein the gas is reduced by the cavitation to a large number of relatively small bubbles.

10. The method of claim 5, wherein the irregularities are bores.

11. The method of claim 5, wherein the rotor has a periphery, and the bores are formed in the periphery.

12. A method of conducting a chemical reaction comprising:
    introducing a fluid containing reactants into a chamber within a housing;
    rotating a rotor in the chamber to create cavitation in the fluid, wherein the rotor includes a plurality of irregularities that induce the cavitation; and
    inducing an electrical current through the fluid in the presence of the cavitation, wherein the rotor and the housing are an anode and a cathode, respectively, or wherein the rotor and the housing are a cathode and an anode, respectively.

13. The method of claim 12, wherein the fluid comprises a cyanide anion.

14. The method of claim 13, further comprising oxidizing the cyanide anion to produce a cyanate anion.

15. The method of claim 12, further comprising conducting the chemical reaction in the presence of a gas, wherein the gas is reduced by the cavitation to a large number of relatively small bubbles.

16. The method of claim 12, wherein the irregularities are bores.

17. The method of claim 16, wherein the rotor has a periphery, and the bores are formed in the periphery.

18. The method of claim 9, wherein the gas is oxygen, and the oxygen reacts in the presence of the electrical potential and the cavitation to form ozone and oxygen radicals.

19. The method of claim 15, wherein the gas is oxygen, and the oxygen reacts in the presence of the electrical current and the cavitation to form ozone and oxygen radicals.

20. The method of claim 5, comprising producing at least two separated products by separating at least two reactants prior to conducting the reactions of the at least two reactants and maintaining such separation during the respective reactions.

21. The method of claim 20, wherein the at least two reactants are separated by an ion exchange membrane.

22. The method of claim 12, comprising producing at least two separated products by separating at least two reactants prior to conducting reactions of the at least two reactants and maintaining such separation during the respective reactions.

23. The method of claim 22, wherein the at least two reactants are separated by an ion exchange membrane.

24. The method of claim 12, further comprising refreshing a surface of at least one of the anode and cathode.

* * * * *